(12) United States Patent
Ruello et al.

(10) Patent No.: US 8,018,845 B2
(45) Date of Patent: Sep. 13, 2011

(54) SAMPLING RATE-LIMITED TRAFFIC

(75) Inventors: Natale Ruello, Mountain View, CA (US); Farrukh Reza Naqvi, Los Altos, CA (US); Anusankar Elangovan, Los Altos, CA (US); Gaetano Borgione, San Jose, CA (US); Suran De Silva, Saratoga, CA (US)

(73) Assignee: Cisco Technology, Inc, San Jose, CA (US)

( * ) Notice: Subject to any disclaimer, the term of this patent is extended or adjusted under 35 U.S.C. 154(b) by 1367 days.

(21) Appl. No.: 11/339,597

(22) Filed: Jan. 25, 2006

(65) Prior Publication Data

US 2007/0171824 A1    Jul. 26, 2007

(51) Int. Cl.
*H04J 1/16* (2006.01)
*H04J 3/14* (2006.01)
*H04L 1/00* (2006.01)
*H04L 12/26* (2006.01)

(52) U.S. Cl. ........ 370/229; 370/232; 370/235; 370/231; 370/230.1

(58) Field of Classification Search ................ 709/225, 709/223, 224, 226, 230, 231, 232, 233, 234, 709/235, 236, 237, 238, 239, 240; 370/229, 370/230, 230.1, 231, 232, 233, 234, 235, 370/236.1, 236.2, 237, 238, 238.1, 239, 240
See application file for complete search history.

(56) References Cited

U.S. PATENT DOCUMENTS

| | | | |
|---|---|---|---|
| 4,733,390 A | 3/1988 | Shirakawa et al. | |
| 5,289,517 A | 2/1994 | Ohba et al. | |
| 5,463,620 A | 10/1995 | Sriram | |
| 5,864,557 A | 1/1999 | Lyons | |
| 5,892,766 A | 4/1999 | Wicki et al. | |
| 5,953,338 A | 9/1999 | Ma et al. | |
| 6,067,301 A | 5/2000 | Aatresh | |
| 6,144,662 A | 11/2000 | Colmant et al. | |
| 6,154,829 A | 11/2000 | Mino et al. | |
| 6,438,134 B1 | 8/2002 | Chow et al. | |
| 6,483,839 B1 | 11/2002 | Gemar et al. | |
| 6,625,266 B1 | 9/2003 | Saari et al. | |
| 6,643,293 B1 | 11/2003 | Carr et al. | |
| 6,678,248 B1 | 1/2004 | Haddock et al. | |
| 7,215,637 B1* | 5/2007 | Ferguson et al. | 370/230.1 |
| 2001/0033581 A1 | 10/2001 | Kawarai et al. | |
| 2002/0087715 A1* | 7/2002 | De Cnodder et al. | 709/235 |
| 2002/0180540 A1 | 12/2002 | Hirai | |

(Continued)

OTHER PUBLICATIONS

Cisco White Paper, "Transit Access Control Lists: Filtering at Your Edge", Aug. 15, 2003, Cisco, all pages.*

(Continued)

*Primary Examiner* — Kwang B Yao
*Assistant Examiner* — Adam Duda
(74) *Attorney, Agent, or Firm* — Law Office of Kirk D. Williams (57) ABSTRACT

Out-of-profile rate-limited traffic is sampled to provide data for analysis, such as for, but not limited to, identifying a threat condition such as a denial-of-service or other malicious attack, or a non-malicious attack such as an error in configuration. A rate limiter including at least three states is typically used, with one of these states being an out-of-profile sampling state wherein the packet traffic is sampled to identify one or more sampled packets on which analysis can be performed, with defensive action possibly taken in response to the analysis.

24 Claims, 8 Drawing Sheets

U.S. PATENT DOCUMENTS

| | | |
|---|---|---|
| 2003/0123449 A1 | 7/2003 | Kuhl et al. |
| 2003/0152084 A1 | 8/2003 | Lee et al. |
| 2005/0152374 A1 | 7/2005 | Cohen et al. |
| 2006/0029079 A1 | 2/2006 | Cohen et al. |
| 2006/0029080 A1 | 2/2006 | Kappler et al. |
| 2006/0062144 A1 | 3/2006 | Testa et al. |
| 2006/0133279 A1 | 6/2006 | Le Faucher et al. |
| 2008/0025214 A1 | 1/2008 | Bettink et al. |

OTHER PUBLICATIONS

Heinanen et al., "A Single Rate Three Color Marker," RFC 2697, IETF, Sep. 1999.

Heinanen et al., "A Two Rate Three Color Marker," RFC 2698, IETF, Sep. 1999.

"Modular QoS CLI (MQC) Three-Level Hierarchical Policer", Cisco Systems, Inc., San Jose, CA, Oct. 1, 2004.

* cited by examiner

SAMPLING RATE-LIMITED TRAFFIC

TECHNICAL FIELD

One embodiment of the invention relates to communications and computer systems, especially routers, packet switching systems, and other devices; and more particularly, one embodiment relates to sampling rate-limited traffic, such as, but not limited to a rate limiter with at least three rate-limiting states including an out-of-profile leak state wherein packets are sampled.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Traffic rate-limiting mechanisms are used to ensure packet traffic conforms to certain predetermined rates. These can be used to protect systems from attacks (e.g., denial-of-service) and to ensure packet traffic conforms to subscribed rates.

Figure 1A:
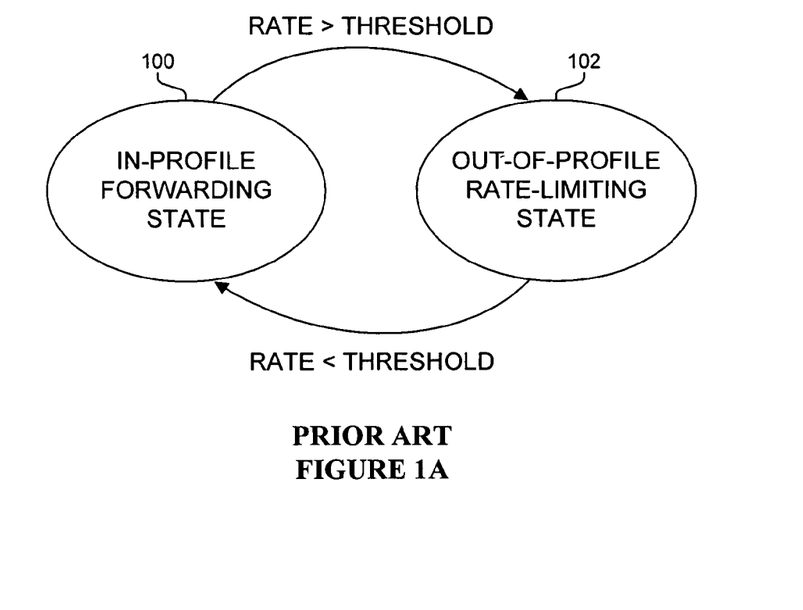
FIGS. 1A-B are block diagrams illustrating prior approaches for rate-limiting of traffic.

Traditional rate limiters are implemented with two rate-limiting states. FIG. 1A illustrates one such prior approach wherein when a rate limiter is in an in-profile forwarding state 100, packets are forwarded normally. In response to the rate exceeding threshold value, the state of the rate limiter switches to an out-of-profile rate-limiting state 102, wherein packets are rate-limited, such as, but not limited to being dropped or redirected to another location or processor. When the rate drops below the threshold (e.g., the rate over time decreases or a new measuring time period commences), the state switches back to in-profile forwarding state 100.

Figure 1B:
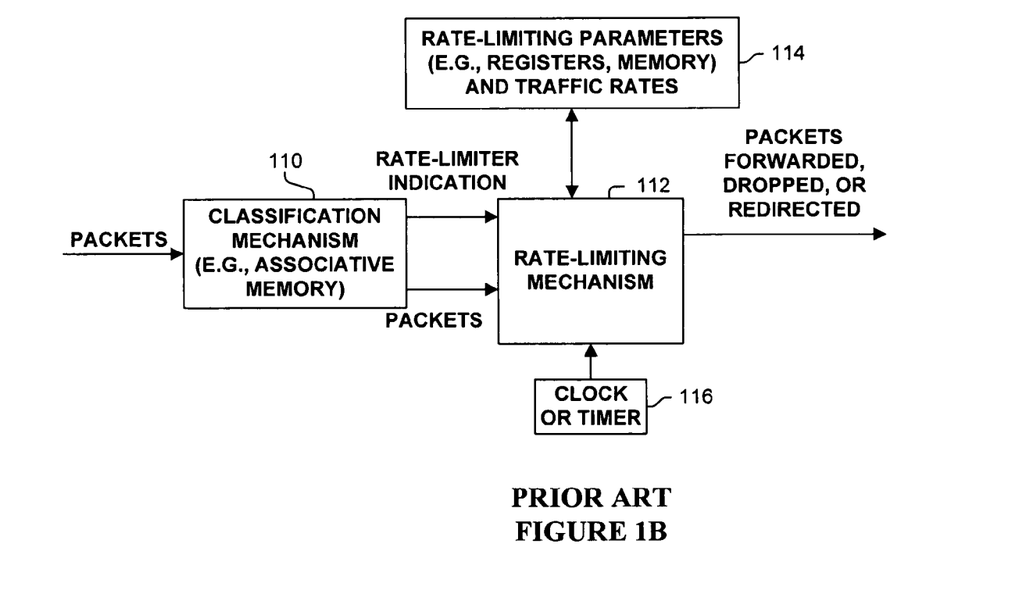

FIG. 1B illustrates a prior art system using a rate limiter for limiting multiple different types and/or streams of traffic. Packets are first classified by classification mechanism 110 (e.g., an associative memory such as a ternary content-addressable memory) to identifying which set of rate-limiting parameters to use. Rate-limiting mechanism 112 retrieves the corresponding parameters 114 based on the rate-limiter indication and performs the appropriative forwarding or rate-limiting operation based on its current state as illustrated by and described in relation to FIG. 1A. Clock or timer 116 provides the timing references as the current rate of a classification of traffic is determined based on a number of packets received in a given time period or over time.

A problem with these prior art rate-limiting systems is that they provide minimal information about the traffic (e.g., statistics of the number of packets dropped) or they redirect all the out-of-profile packets to a processing mechanism, which can be overwhelmed by the number of packets.

SUMMARY

Disclosed are, inter alia, methods, apparatus, data structures, computer-readable media, mechanisms, and means for sampling rate-limited traffic, such as, but not limited to a rate limiter with at least three rate-limiting states including an out-of-profile leak state wherein packets are sampled.

One embodiment that rate limits and samples rate-limited packet traffic maintains a representation of a current rate of packet traffic. The current rate corresponds to one of multiple rate-limiting states, which include an in-profile forwarding state corresponding to the current rate of packet traffic being below a first threshold, an out-of-profile leak state corresponding to the current rate of traffic being above the first threshold and below a second threshold, and an out-of-profile rate-limiting state corresponding to the current rate of traffic being above the second threshold. Packets are rate-limited (i.e., throttled or not throttled) according to the rate-limiting state corresponding to the current rate of packet traffic, wherein packets are forwarded normally during the in-profile forwarding state, one or more of the packets are selected during the out-of-profile leak state such that said selected packets are forwarded to a processing mechanism for processing said selected packets while any non-selected packets during the out-of-profile leak state are rate-limited of a first type, and packets during the out-of-profile rate-limiting state are rate-limited of a second type.

In one embodiment, exactly one packet is selected during the out-of-profile leak state. In one embodiment, multiple particular packets are selected during the out-of-profile leak state, with these particular packets including at least two consecutively received packets. In one embodiment, rate limiting of the first type causes the packets to be dropped and said rate limiting of the second type causes the packets to be dropped. In one embodiment, the processing mechanism identifies a threat condition based on one or more of said selected packets, and in response to said identified threat condition, defensive action is taken to reduce said identified threat condition. In one embodiment, the defensive action includes adjusting at least one of the first or second thresholds.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, methods, apparatus, data structures, computer-readable media, mechanisms, and means for sampling rate-limited traffic, such as, but not limited to a rate limiter with at least three rate-limiting states including an out-of-profile leak state wherein packets are sampled.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for sampling rate-limited traffic, such as, but not limited to a rate limiter with at least three rate-limiting states including an out-of-profile leak state wherein packets are sampled.

One embodiment for rate limiting and sampling rate limited packets includes: maintaining a representation of a current rate of packet traffic for a classification of traffic, the current rate corresponding to one of a plurality of rate limiting states, the plurality of rate limiting states including an in profile forwarding state corresponding to the current rate of packet traffic being below a first threshold, an out of profile leak state corresponding to the current rate of traffic being above the first threshold and below a second threshold, and an out of profile rate limiting state corresponding to the current rate of traffic being above the second threshold; and rate limiting packets of said packet traffic according to said rate limiting state corresponding to the current rate of packet traffic, wherein packets are forwarded normally during the in profile forwarding state, one or more of the packets are selected during the out of profile leak state such that said selected packets are forwarded to a processing mechanism for processing said selected packets while any non selected packets during the out of profile leak state are rate-limited of a first type, and packets during the out of profile rate limiting state are rate-limited of a second type.

In one embodiment, wherein exactly one packet is selected during the out of profile leak state. In one embodiment, a plurality of particular packets are selected during the out of profile leak state, said particular packets including at least two consecutively received packets. In one embodiment, said rate limiting of the first type causes the packets to be dropped and said rate limiting of the second type causes the packets to be dropped. In one embodiment, the processing mechanism identifies a threat condition based on one or more of said selected packets, and in response to said identified threat condition, defensive action is taken to reduce said identified threat condition. In one embodiment, said defensive action includes adjusting at least one of the first or second thresholds. In one embodiment, exactly one packet is selected during the out of profile leak state. In one embodiment, a plurality of particular packets are selected during the out of profile leak state, said particular packets including at least two consecutively received packets. In one embodiment, said defensive action includes installing an access control list entry in an access control list being applied to said packet traffic to counter said identified threat condition.

One embodiment includes: a classification mechanism for classifying packet traffic into a plurality of classified packet traffic flows; a rate limiter configured to rate limit traffic of said classified packet traffic flows according to a current rate limiting state of a plurality of rate limiting states identified based on a current rate of packet traffic for, the plurality of rate limiting states including an in profile forwarding state, an out of profile leak state, and an out of profile rate limiting state; wherein said rate limiting of traffic according to the current rate limiting state includes forwarding packets normally during the in profile forwarding state, sampling packets during the out of profile leak state such that said sampled packets are forwarded to a processing mechanism while non sampled packets during the out of profile leak state are rate-limited of a first type, and packets during the out of profile rate limiting state are rate-limited of a second type.

One embodiment comprises the processing mechanism configured for analyzing leaked packets and to reacting to identified conditions based on an analysis of said leaked packets. In one embodiment, said reacting to identified conditions includes adjusting a rate threshold defining said in profile forwarding state. In one embodiment, the current rate limiting state transitions from the in profile forwarding state to the out of profile leak state and then to the out of profile rate limiting state. In one embodiment, the current rate limiting state transitions from the out of profile leak state to the out of profile rate limiting state in response to achieving a predetermined number of packets.

One embodiment includes: means for identifying a current rate limiting state of a plurality of rate limiting states for a classification of traffic, the plurality of rate limiting states including an in profile forwarding state, an out of profile leak state, and an out of profile rate limiting state; and means for rate limiting packets of said packet traffic according to said rate limiting state, wherein packets are forwarded normally during the in profile forwarding state, one or more of the packets are selected during the out of profile leak state such that said selected packets are forwarded to a processing mechanism for processing said selected packets while any non selected packets during the out of profile leak state are rate-limited of a first type, and packets during the out of profile rate limiting state are rate-limited of a second type.

One embodiment includes means for performing defensive action; wherein the processing mechanism is configured to identify a threat condition based on one or more of said selected packets, and said means for performing defensive action is responsive to said identifying the threat condition by the processing mechanism. In one embodiment, exactly one packet is selected during the out of profile leak state. In one embodiment, a plurality of particular packets are selected during the out of profile leak state, said particular packets including at least two consecutively received packets. In one embodiment, said means for identifying a current rate limiting state includes means for identifying a current rate of packet traffic. In one embodiment, said means for identifying a current rate of packet traffic includes means for updating a token value. In one embodiment, said means for identifying a current rate of packet traffic includes means for updating a main token value and a burst token value.

One embodiment of rate limiting and sampling rate limited packet traffic includes: maintaining a representation of a current rate of packet traffic for a classification of traffic, the current rate corresponding to one of a plurality of rate limiting states, the plurality of rate limiting states including an in profile forwarding state corresponding to the current rate of packet traffic being below a first threshold, an out of profile leak state corresponding to the current rate of traffic being above the first threshold and below a second threshold, and an out of profile rate limiting state corresponding to the current rate of traffic being above the second threshold; and rate limiting packets of said packet traffic according to said rate limiting state corresponding to the current rate of packet traffic, wherein packets are forwarded normally during the in profile forwarding state, one or more of the packets are selected during the out of profile leak state such that said selected packets are both forwarded normally and sent to a processing mechanism for processing, and packets during the out of profile rate limiting state are forwarded normally or rate-limited of a second type.

In one embodiment, all packet are selected during the out of profile leak state. In one embodiment, packets are not forwarded normally during the out of profile rate limiting state.

Figure 2:
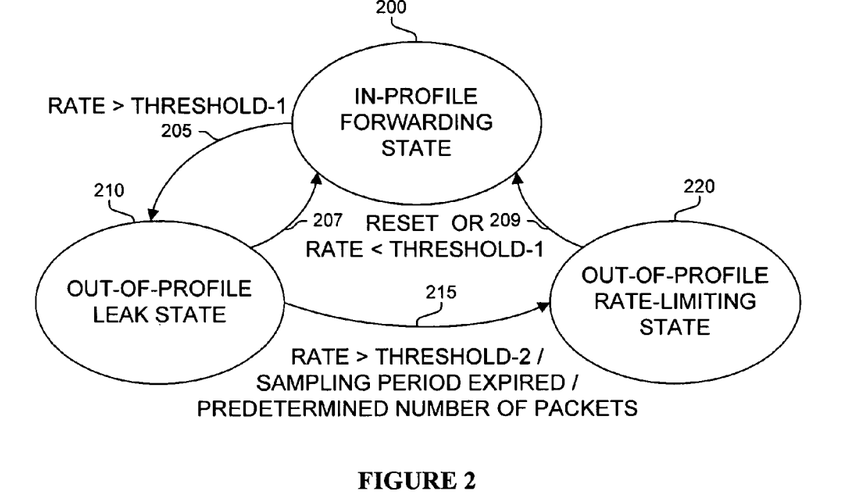
FIG. 2 is a block diagram illustrating multiple rate-limiting states including an out-of-profile leak state used in one embodiment.

FIG. 2 is a block diagram illustrating multiple rate-limiting states including an out-of-profile leak state used in one embodiment. As shown, the rate limiter is in in-profile forwarding state 200 when the traffic conforms to its predetermined rate. Traffic is typically forwarded normally when the rate limiter is in in-profile forwarding state 200. When the rate exceeds a first predetermined threshold rate (205), the current state of the rate limiter changes to out-of-profile leak state 210. While the rate limiter is in out-of-profile leak state 210, packets are sampled (also referred to as packets being "leaked") and redirected to a particular destination, such as, but not limited to a processing mechanism (e.g., a system that analyzes the sampled packets and/or logs the sampled packets and/or performs some other function). This sampling of packets may include only redirecting the packet, or redirecting the packet as well as forwarding the packet normally, i.e., in other words, the packet (or a copy thereof) is both forwarded as normal and redirected or otherwise forwarded to a processing mechanism. After the rate exceeds a second predetermined threshold (which includes a predetermined number of packets received during the out-of-profile leak state 210) or the sampling period expires, the state changes (215) to out-of-profile rate-limiting state 220, in which packets are typically dropped or redirected to another destination (i.e., the packets are typically not forwarded normally). The state of the rate limiter transitions (207, 209) back to in-profile forwarding state 200 in response to the rate dropping below the first threshold (e.g., the rate over time decreases or a new measuring time period commences).

Note, one embodiment provides a programmable type of rate limiting for each of the rate-limiting states, with these programmable types of rate limiting including, but not limited to forwarding as normal, redirect (e.g., forward to a specified destination), drop, forward and snoop (e.g., forward as well as provide a copy to another destination), redirect and snoop, and drop and snoop.

Figure 3A:
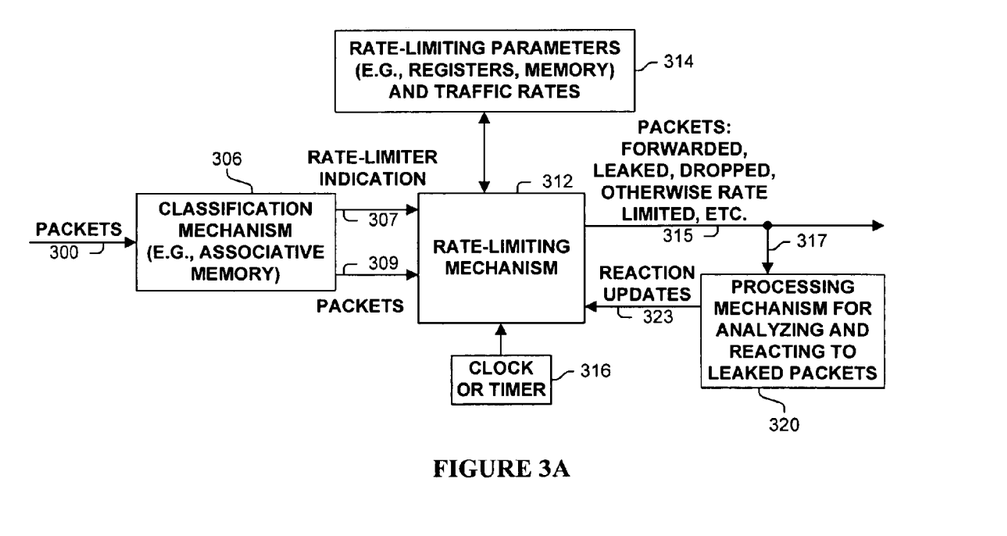
FIG. 3A is a block diagram of a system that samples rate-limited traffic, analyzes these samples, and reacts to identified conditions.

FIG. 3A is a block diagram of a system that samples rate-limited traffic, analyzes these samples, and reacts to identified conditions. A packet 300 is received and then is classified by classification mechanism 306 to identify which rate limiter the packet corresponds (specified by rate-limiter indication 307). Note, the term "rate limiter" refers to a rate-limiting mechanism with corresponding rate-limiting parameters and/or the measured and/or approximated current traffic rate for a particular classification of packets.

Rate-limiting mechanism 312 retrieves for the corresponding rate-limiting parameters, current traffic rate, and/or current rate-limiting state (314) based on rate-limiter indication 307, and rate limits the corresponding packet 309 accordingly. The exact retrieved information depends on the embodiment. For example, one embodiment maintains a current token value and one or more threshold values for each classification of packets in memory or registers 314, which allows rate-limiting mechanism to readily identify the current rate-limiting state. In one embodiment, mechanism 314 maintains these values and merely provides rate-limiting mechanism the current rate-limiting state corresponding to the packet 309 to be rate limited. In one embodiment, rate-limiting mechanism is responsive to clock or timer 316, as a rate is a function of time. For example, one embodiment represents the measurement of the current rate as a current number of tokens in a current time period, with the tokens being re-initialized every expiration of the time period. In one embodiment, the number of packets or bytes thereof are maintained with a calculation performed based on a time duration to identify the current packet rate. In one embodiment, the number of packets or bytes thereof are maintained and are aged over time.

Rate-limiting mechanism 312 rate-limits (e.g., forwards normally, drops, redirects, etc.) (315) packet 309 according to the current rate-limiting state. In one embodiment, sampled packets during the out-of-profile leak state are redirected (317) to processing mechanism 320, which analyzes these sampled packets. If a condition is detected, such as a denial-of-service attack or other offensive condition (whether malicious or not), processing mechanism 320 may initiate a reaction (323) to such identified condition to modify the operation of rate-limiting mechanism, such as to modify its transition between states for the corresponding packet classification (and possibly others) such that the offending traffic can be further reduced (e.g., dropped, redirected) such that it does not proceed downstream.

Figure 3B:
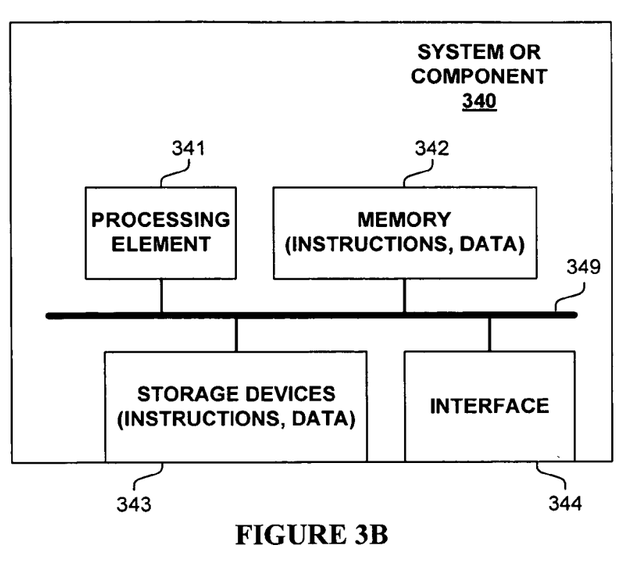
FIG. 3B is block diagram of a system or component used in one embodiment.

FIG. 3B is block diagram of a system or component 340 used in one embodiment for maintaining performing class-based bandwidth partitioning. In one embodiment, system or component 340 performs one or more processes corresponding to one of the flow diagrams or pseudo code illustrated or otherwise described herein.

In one embodiment, system or component 340 includes a processing element 341, memory 342, storage devices 343, and an interface 344 for sending and receiving packets and/or communicating with external devices (e.g. one or more memories and/or classification/lookup mechanisms), which are typically communicatively coupled via one or more communications mechanisms 349, with the communications paths typically tailored to meet the needs of the application.

Various embodiments of component 340 may include more or less elements. The operation of component 340 is typically controlled by processing element 341 using memory 342 and storage devices 343 to perform one or more tasks or processes. Memory 342 is one type of computer-readable medium, and typically comprises random access memory (RAM), read only memory (ROM), flash memory, integrated circuits, and/or other memory components. Memory 342 typically stores computer-executable instructions to be executed by processing element 341 and/or data which is manipulated by processing element 341 for implementing functionality in accordance with an embodiment. Storage devices 343 are another type of computer-readable medium, and typically comprise solid state storage media, disk drives, diskettes, networked services, tape drives, and other storage devices. Storage devices 343 typically store computer-executable instructions to be executed by processing element 341 and/or data which is manipulated by processing element 341 for implementing functionality in accordance with an embodiment.

Figure 4A:
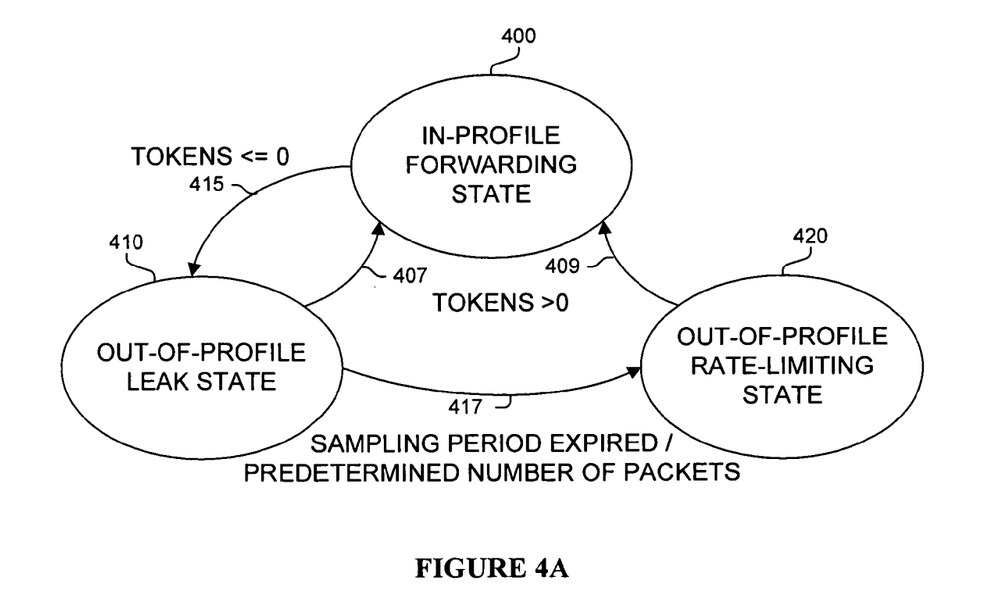
FIGS. 4A-C illustrate the operation of one embodiment that uses multiple rate-limiting states including an out-of-profile leak state in rate limiting of traffic.
Figure 4B:
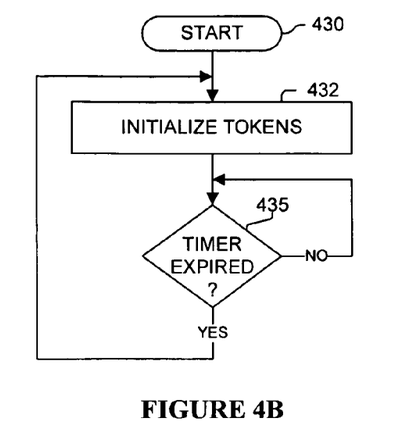
Figure 4C:
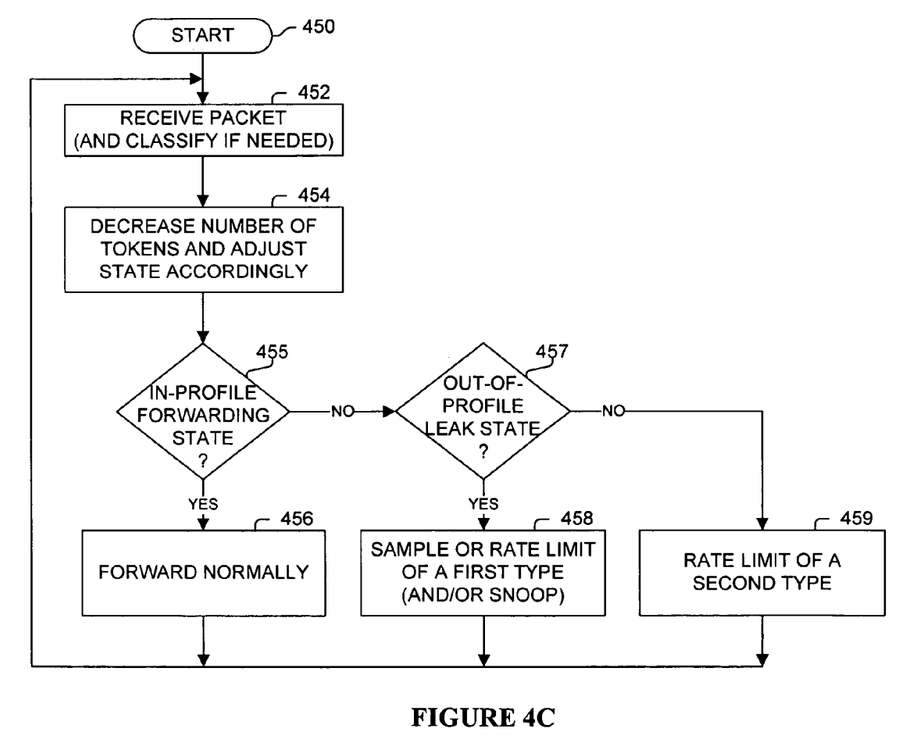

FIGS. 4A-C illustrate the operation of one embodiment that uses multiple rate-limiting states including an out-of-profile leak state in rate limiting of traffic. Note, the state diagram illustrated in FIG. 4A illustrates one embodiment of the state diagram illustrated in FIG. 2, wherein FIG. 4A specifically refers to tokens. As shown in FIG. 4A, the rate-limiting mechanism includes at least the three states of in-profile forwarding state 400, out-of-profile leak state 410, and out-of-profile rate-limiting state 420. In one embodiment, each packet classification is allocated a number of tokens corresponding to its authorized rate each time period (e.g., the current token value is reset to this value at the expiration of the measuring period). The current number of tokens is reduced by the number of packets or bytes thereof processed during the current time period. When the number of tokens becomes non-positive, the current rate-limiting state transitions (415) to out-of-profile leak state 410. When the sampling period expires (e.g., after sampling a predetermined number of packets such as one packet, after sampling at least two consecutive packets, after sampling a predetermined number of packets such as sampling one packet every nth packet received during the out-of-profile leak state (410), the current rate-limiting state transitions (417) to out-of-profile rate-limiting state 420. When the number of tokens is reset or otherwise becomes positive, the current rate-limiting state transitions (407, 409) to in-profile forwarding state 400.

FIG. 4B illustrates a process used in one embodiment for resetting the number of tokens in a rate limiter. Processing begins with process block 430, and proceeds to process block 432, wherein the number of tokens is initialized to a value based on the allowed rate for the corresponding classification of traffic. When the timer expires as determined by process block 435, processing returns to process block 432 to reset the number of tokens.

FIG. 4C illustrates a process used in one embodiment for rate-limiting traffic. Processing begins with process block 450. In process block 452, a packet is received (and classified if the corresponding rate-limiter needs to be identified). Note, as one skilled in the art would clearly understand, a packet is classified typically by extracting one or more fields from the packet and then performing a lookup operation using this value as a search key in order to generate a classification indication corresponding to the packet.

In process block 454, the number of tokens is decreased (e.g., by one, by the number of bytes in the packet, or by some other amount corresponding to an amount of traffic). As determined in process block 455, if the current rate-limiting state identified based on the current number of tokens (for the current rate time period) is the in-profile forwarding state, then packets are forwarded as normal in process block 456. Otherwise, as determined by process block 457, if the current rate-limiting state is the out-of-profile leak state 410, the packet is sampled (e.g., the packet itself or a copy thereof is forwarded to a processing mechanism) or the packet is rate-limited of a first type in process block 458. Note, in one embodiment, one or more packets (and possibly all packets) are selected for snooping (e.g., forwarding copies of the packet both normally and to a processing mechanism, such as, but not limited to allowing the selected traffic to be analyzed without affecting the normal flow of the packet stream). Otherwise, the packet is rate-limited of a second type (as the state is the out-of-profile rate-limiting state) in process block 459. Note, in one embodiment, all traffic for the packet stream is forwarded, which may be particularly useful when the packets are snooped when in the out-of-profile leak state. Processing returns to process block 452 to receive and process the next packet.

Figure 5A:
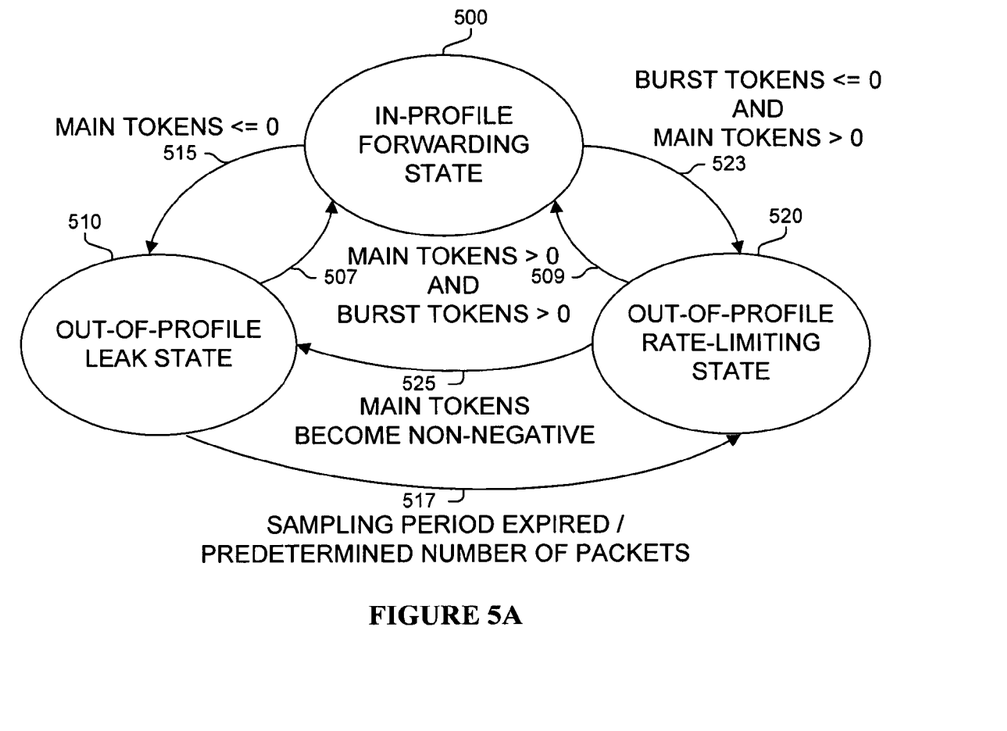
FIGS. 5A-C illustrate the operation of one embodiment that uses multiple rate-limiting states including an out-of-profile leak state in rate limiting of traffic.
Figure 5B:
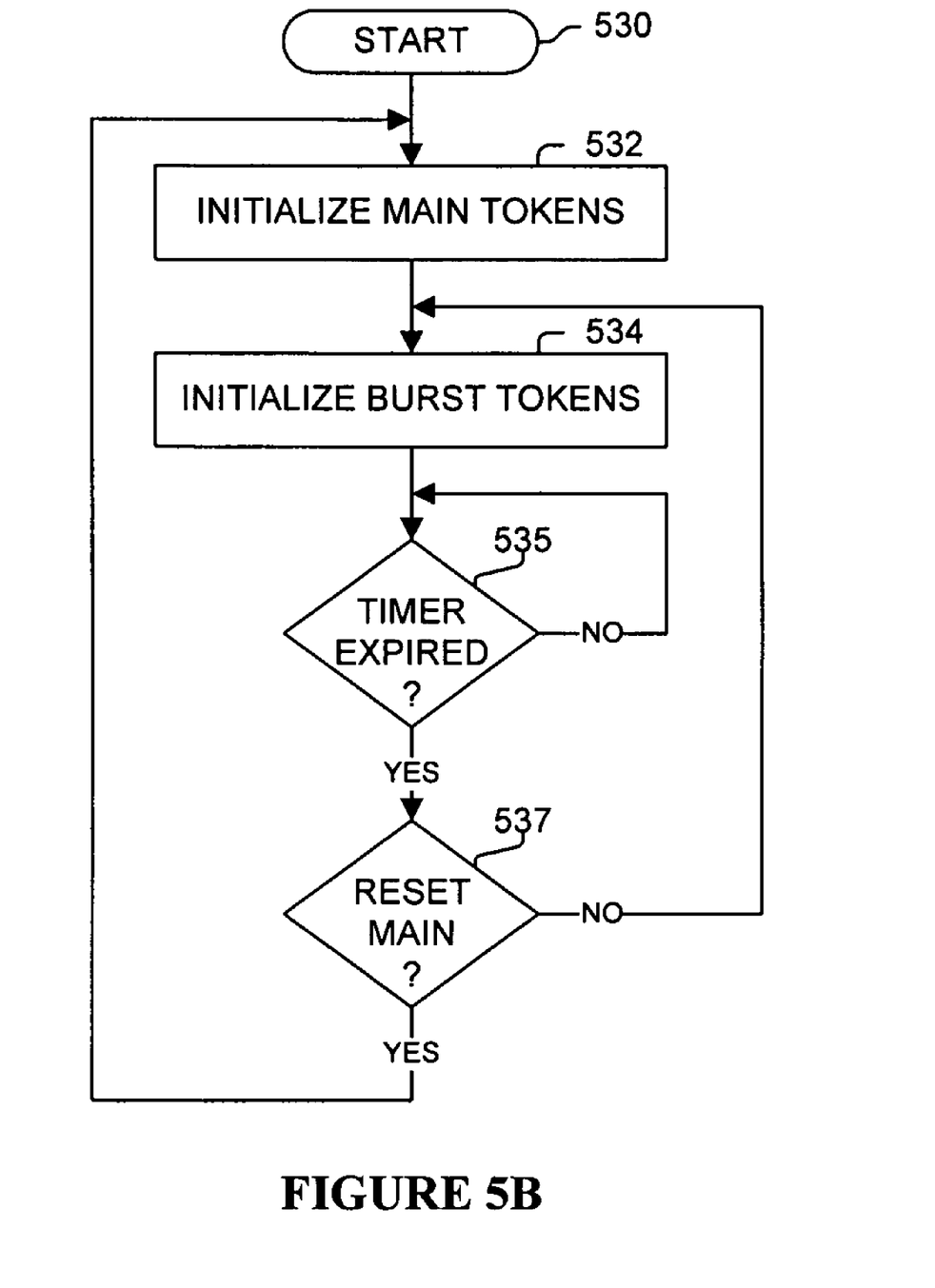
Figure 5C:
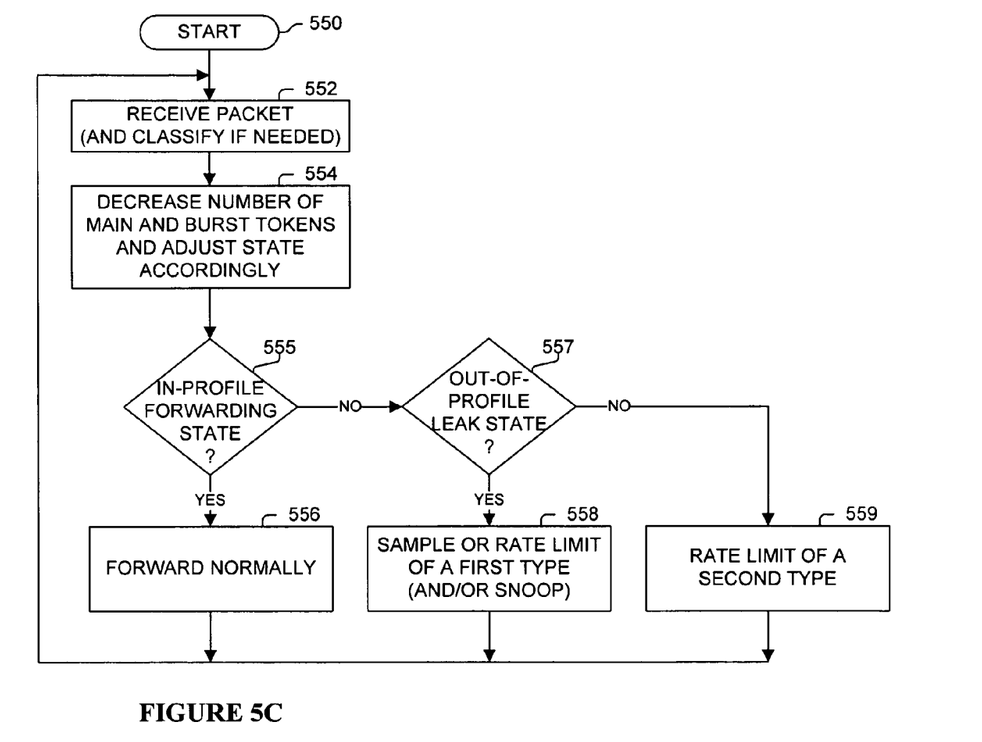

FIGS. 5A-C illustrate the operation of one embodiment that uses multiple rate-limiting states including an out-of-profile leak state in rate limiting of traffic. This embodiment operates in a manner similar to that illustrated in FIGS. 4A-C, but also includes a burst rate to rate-limit the traffic in sub-time periods of the overall time period, which possibly has the effect of reducing the overall burstiness of the rate limiting of a classification of packet traffic.

As shown in FIG. 5A, the rate-limiting mechanism includes at least the three states of in-profile forwarding state 500, out-of-profile leak state 510, and out-of-profile rate-limiting state 520. In one embodiment, each packet classification is allocated a number of main tokens corresponding to its authorized rate each time period (e.g., the current token value is reset to this value at the expiration of the measuring period), as well as a number of burst tokens corresponding to its authorized rate each burst time period within the main time period. The current number of burst and main tokens are reduced by the number of packets or bytes thereof processed during the current burst and main time periods.

When the number of main tokens becomes non-positive, the current rate-limiting state transitions (515) to out-of-profile leak state 510, or if the burst number of tokens becomes non-positive, the current rate-limiting state transitions (523) to out-of-profile rate-limiting state 520. When in the out-of-profile leak state 510, in response to the sampling period expiring (e.g., after sampling a predetermined number of packets such as one packet, after sampling at least two consecutive packets, after sampling a predetermined number of packets such as sampling one packet every nth packet received during the out-of-profile leak state (510), the current rate-limiting state transitions (517) to out-of-profile rate-limiting state 520. When in the out-of-profile rate-limiting state 520, if the number of main tokens becomes non-negative (e.g., in the case where you were burst limited and then the main number of tokens became non-negative), the current rate-limiting state transitions (525) to out-of-profile leak state 510. When in the out-of-profile leak state 510 or in the out-of-profile rate-limiting state 520, if the number of burst tokens and the number of main tokens are both greater than zero, then the current rate-limiting state transitions (507, 509) to in-profile forwarding state 500.

FIG. 5B illustrates a process used in one embodiment for resetting the number of main and burst tokens in a rate limiter. Processing begins with process block 530, and proceeds to process block 532, wherein the number of mains tokens is initialized to a value based on the allowed rate for the corresponding classification of traffic. In process block 534, the number of burst tokens is initialized to a value based on the allowed rate for the corresponding classification of traffic within the burst period. When the timer expires as determined in process block 535, then as determined in process block 537, if the main time period is not expired (e.g., a count of the number of burst periods within the current main time period does not equal the total number of burst periods within the current main time period), then in process block 534, only the number of burst tokens is initialized. Otherwise, processing returns to process block 532 to initialize the number of main tokens and then to process block 534 to initialize the number of burst tokens.

FIG. 5C illustrates a process used in one embodiment for rate-limiting traffic. Processing begins with process block 550. In process block 552, a packet is received (and classified if the corresponding rate-limiter needs to be identified). In process block 554, the number of main tokens and number of burst tokens are decreased (e.g., by one, by the number of bytes in the packet, or by some other amount corresponding to an amount of traffic). As determined in process block 555, if the current rate-limiting state is the in-profile forwarding state, then packets are forwarded as normal in process block 556. Otherwise, as determined by process block 557, if the current rate-limiting state is the out-of-profile leak state 510, the packet is sampled (e.g., the packet itself or a copy thereof is forwarded to a processing mechanism) or the packet is rate-limited of a first type in process block 558. Note, in one embodiment, one or more packets (and possibly all packets) are selected for snooping (e.g., forwarding copies of the packet both normally and to a processing mechanism, such as, but not limited to allowing the selected traffic to be analyzed without affecting the normal flow of the packet stream). Otherwise, the packet is rate-limited of a second type (as the state is the out-of-profile rate-limiting state) in process block 559. Note, in one embodiment, all traffic for the packet stream is forwarded, which may be particularly useful when the packets are snooped when in the out-of-profile leak state. Processing returns to process block 552 to receive and process the next packet.

Figure 6:
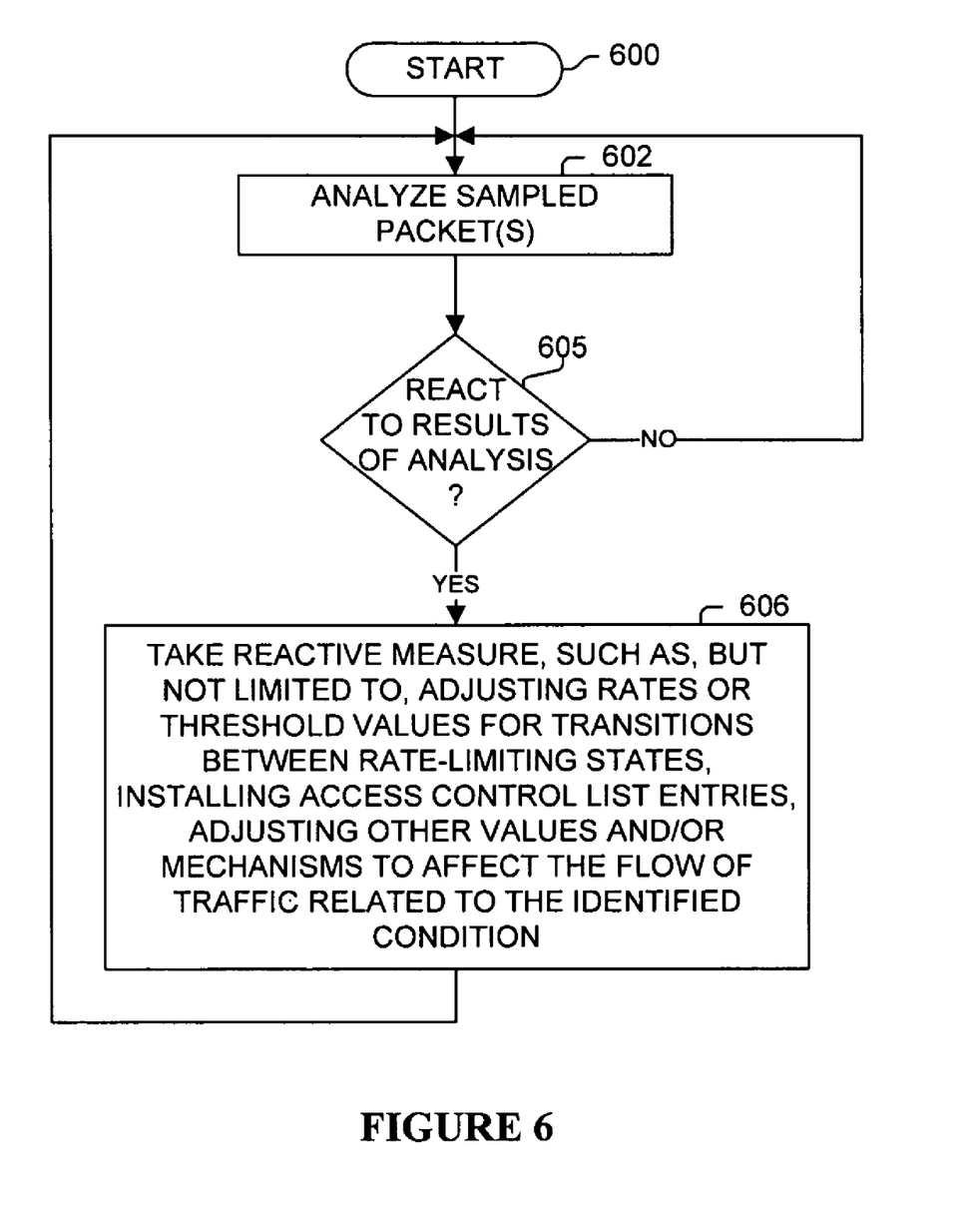
FIG. 6 illustrates a process used in one embodiment for analyzing sampled rate-limited traffic and reacting to identified conditions.

FIG. 6 illustrates a process used in one embodiment for analyzing sampled rate-limited traffic and reacting to identified conditions. Processing begins with process block 600, and proceeds to process block 602, wherein one or more sampled packets are analyzed, such as, but not limited to identifying whether or not a threat condition exists. Identifying threat conditions is well-understood in the art and the approach and exact analysis performed on the data points (i.e., on the sampled packets according to an embodiment) is dependent on the configuration of the system. If a threat condition is identified, as indicated by process block 605, then in response to the identified threat condition, defensive action is taken in process block 606 to reduce said identified threat condition, such as, but not limited to, adjusting rates or threshold values for the transition(s) between one or more rate-limiting states, installing access control list entries, adjusting other values and/or mechanisms to affect the flow of traffic related to the identified condition. Processing is returned to process block 602 to analyze more sampled packets.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method of rate-limiting and sampling rate-limited packets, the method comprising:

identifying a current rate of packet traffic for a classification of traffic, the current rate corresponding to one of a plurality of rate-limiting states, the plurality of rate-limiting states including an in-profile forwarding state corresponding to the current rate of packet traffic being below a first threshold, an out-of-profile leak state corresponding to the current rate of traffic being above the first threshold and below a second threshold, and an out-of-profile rate-limiting state corresponding to the current rate of traffic being above the second threshold; and rate-limiting packets of said packet traffic according to said rate-limiting state corresponding to the current rate of packet traffic, wherein packets are forwarded normally during the in-profile forwarding state, one or more of the packets are selected during the out-of-profile leak state such that said selected packets are forwarded to a processing mechanism for processing said selected packets in order to analyze said selected packets to determine whether or not to modify said rate-liming packets of said packet traffic while a plurality of non-selected packets during the out-of-profile leak state are rate-limited of a first type, and packets during the out-of-profile rate-limiting state are rate-limited of a second type.

2. The method of claim 1, wherein exactly one packet is selected during the out-of-profile leak state.

3. The method of claim 1, wherein a plurality of particular packets are selected during the out-of-profile leak state, said particular packets including at least two consecutively received packets.

4. The method of claim 1, wherein said rate limiting of the first type causes the packets to be dropped and said rate limiting of the second type causes the packets to be dropped.

5. The method of claim 1, wherein the processing mechanism identifies a threat condition based on one or more of said selected packets, and in response to said identified threat condition, defensive action is taken to reduce said identified threat condition.

6. The method of claim 5, wherein said defensive action includes adjusting at least one of the first or second thresholds.

7. The method of claim 6, wherein exactly one packet is selected during the out-of-profile leak state.

8. The method of claim 6, wherein a plurality of particular packets are selected during the out-of-profile leak state, said particular packets including at least two consecutively received packets.

9. The method of claim 5, wherein said defensive action includes installing an access control list entry in an access control list being applied to said packet traffic to counter said identified threat condition.

10. An apparatus, comprising:
a classification mechanism for classifying packet traffic into a plurality of classified packet traffic flows;
a rate-limiter configured to rate limit traffic of said classified packet traffic flows according to a current rate-limiting state of a plurality of rate-limiting states identified based on a current rate of packet traffic, the plurality of rate-limiting states including an in-profile forwarding state, an out-of-profile leak state, and an out-of-profile rate-limiting state;
wherein said rate limiting of traffic according to the current rate-limiting state includes forwarding packets normally during the in-profile forwarding state, sampling one or more packets during the out-of-profile leak state such that said sampled packets are forwarded to a processing mechanism for analyzing said sampled packets to determine whether or not to modify said rate liming of traffic while a plurality of non-sampled packets during the out-of-profile leak state are rate-limited of a first type, and packets during the out-of-profile rate-limiting state are rate-limited of a second type.

11. The apparatus of claim 10, comprising the processing mechanism configured for analyzing leaked packets and to reacting to identified conditions based on an analysis of said leaked packets.

12. The apparatus of claim 11, wherein said reacting to identified conditions includes adjusting a rate threshold defining said in-profile forwarding state.

13. The apparatus of claim 10, wherein the current rate-limiting state transitions from the in-profile forwarding state to the out-of-profile leak state and then to the out-of-profile rate-limiting state.

14. The apparatus of claim 13, wherein the current rate-limiting state transitions from the out-of-profile leak state to the out-of-profile rate-limiting state in response to receiving a predetermined number of packets while in the out-of-profile leak state.

15. An apparatus, comprising:
means for identifying a current rate-limiting state of a plurality of rate-limiting states for a classification of traffic, the plurality of rate-limiting states including an in-profile forwarding state, an out-of-profile leak state, and an out-of-profile rate-limiting state; and
means for rate-limiting packets of said packet traffic according to said rate-limiting state, wherein packets are forwarded normally during the in-profile forwarding state, one or more of the packets are selected during the out-of-profile leak state such that said selected packets are forwarded to a processing mechanism for processing said selected packets in order to analyze said selected packets to determine whether or not to modify said rate-liming packets of said packet traffic while a plurality of non-selected packets during the out-of-profile leak state are rate-limited of a first type, and packets during the out-of-profile rate-limiting state are rate-limited of a second type.

16. The apparatus of claim 15, comprising means for performing defensive action; wherein the processing mechanism is configured to identify a threat condition based on one or more of said selected packets, and said means for performing defensive action is responsive to said identifying the threat condition by the processing mechanism.

17. The apparatus of claim 15, wherein exactly one packet is selected during the out-of-profile leak state.

18. The apparatus of claim 15, wherein a plurality of particular packets are selected during the out-of-profile leak state, said particular packets including at least two consecutively received packets.

19. The apparatus of claim 15, wherein said means for identifying a current rate-limiting state includes means for identifying a current rate of packet traffic.

20. The apparatus of claim 19, wherein said means for identifying the current rate of packet traffic includes means for updating a token value.

21. The apparatus of claim 20, wherein the current rate of packet traffic includes a burst rate; wherein the token value is a main token value; and
wherein said means for identifying the current rate of packet traffic includes means for updating a burst token value corresponding to the burst rate.

22. A method of rate-limiting and sampling rate-limited packet traffic, the method comprising:
identifying a current rate of packet traffic for a classification of traffic, the current rate corresponding to one of a plurality of rate-limiting states, the plurality of rate-limiting states including an in-profile forwarding state corresponding to the current rate of packet traffic being below a first threshold, an out-of-profile leak state corresponding to the current rate of traffic being above the first threshold and below a second threshold, and an out-of-profile rate-limiting state corresponding to the current rate of traffic being above the second threshold; and
rate-limiting packets of said packet traffic according to said rate-limiting state corresponding to the current rate of packet traffic, wherein packets are forwarded normally during the in-profile forwarding state, one or more of the packets are selected during the out-of-profile leak state such that said selected packets are both forwarded normally and sent to a processing mechanism for processing in order to analyze said selected packets to determine whether or not to modify said rate-liming packets of said packet traffic, and packets during the out-of-profile rate-limiting state are forwarded normally or rate-limited of a second type.

23. The method of claim 22, wherein all packet are selected during the out-of-profile leak state.

24. The method of claim 22, wherein packets are not forwarded normally during the out-of-profile rate-limiting state.

* * * * *